Patented Dec. 24, 1929

REISSUED 1,740,718

UNITED STATES PATENT OFFICE

EDWIN C. WALLACE, OF NEWTON, MASSACHUSETTS

PENETRATION METHOD OF ROAD CONSTRUCTION

No Drawing.   Application filed August 20, 1928. Serial No. 300,958.

For some years past, highways, streets and roads have been constructed under the term "bituminous macadam penetration method" by spreading crushed stone, gravel or slag upon a previously prepared base in a layer from 2–6″ or more in thickness which is determined by traffic conditions, then applying thereto, generally by spraying under pressure, a rather soft bituminous cementing medium in a highly heated condition.

A thin layer of smaller stone is then spread over this bituminous coating and rolled. More heated bituminous cement is then applied and after covering it with stone screening, sand or similar material, the entire mass is thoroughly compacted.

Some roads constructed by this method have given excellent results, but others constructed by the same method under similar conditions have been very troublesome, expensive to maintain and generally unsatisfactory. In order to cause proper adhesion of the bituminous cement to the stone, it is the general practice in work of this type to use bituminous cement of rather soft consistency. When tested at 25° C. (77° F.) a No. 2 needle weighted to 100 grams will sink from 10 to 15 mm. in 5 seconds. This is usually referred to as "100 to 150° penetration" on standard penetration machines now in general use.

When exposed to the rays of the summer sun this bituminous cement softens and by coming to the surface, causes the condition technically known as "bleeding".

Wherever bleeding occurs it is necessary to cover the "fat spots" with sand, fine stone or dust to prevent it from being picked up by passing vehicles. Under traffic the sand or stone thus spread over the fat spots is forced into the bitumen with the result that high spots are formed and a rough uneven surface soon develops.

The improvement herein described is designed to overcome those weak points in the penetration method of construction of highways, by securing better adhesion to the stone, permitting the use of bituminous cement of harder consistency than could otherwise be used and also by reduction of the amount required to waterproof the surface and bond the stone firmly together so there is no excess bitumen to be forced to the top under the condition which usually causes "bleeding".

By this method it is possible to use bituminous cement of a consistency from 10 to 35° harder and to reduce the quantity required from 5 to 20% below the normal requirements of the usual method of construction.

It also obviates difficulties caused by fine dust adhering to the stone, a condition which it is practically imposible to avoid as dust is formed by attrition of the stone during process of rolling and even when perfectly clean at time of spreading there is more or less adherent dust by the time the bituminous cement is applied.

The improved process may be described as follows:

Upon the previously prepared base, a layer of stone of the desired size is spread to such depth that after thorough compression the layer will be of required thickness, say 2 to 4 inches, although the thickness of the layer may be any desired depth.

The stone is coated either before or after it is in place, with a small quantity of hydrocarbon oil of a mobile, penetrating nature, but substantially non-volatile at atmospheric temperature. This oil must be sufficiently mobile or lacking in viscosity to penetrate the surface pores of the stone and cause the heated bituminous cement later applied, to adhere firmly to the stone, notwithstanding the presence of hygroscopic moisture and adherent particles of dust which can never be wholly eliminated. While it increases the adhesion between the stone and the cement the oil does not soften the bituminous cement to an appreciable degree. It must be miscible in all proportions with the bituminous cementing medium and preferably consists of a mixture of cyclic and open chain hydrocarbons with specific gravity ranging from .8 to .92 and volatility not exceeding one third of its volume in five hours at 100° C. (212° F.), with viscosity in the Engler viscosimeter at 25° C. ranging between 75 and 135 seconds.

It is preferably applied to the stone at least two hours before the application of the bituminous cementing medium in order to allow all portions of the surface of the stone pieces to be thoroughly wetted by the oil without using an excess.

Whether the stone is coated before or after it is in place upon the road, under average working conditions, one (1) gallon of oil should cover sufficient stone to form a layer 3" thick after compression over an area of 8 to 10 sq. yds.

After stone is in place it is compacted until a loaded truck may be driven over it without displacing the stone to form ridges or ruts. It is then coated with heated bituminous cement at the rate of 10 to 15 lbs. per sq. yd. 12.5 lbs. or approximately 1½ gal. of heated bituminous cement applied to the oil coated stone will bind the particles as firmly together as the 15, 20 or more pounds per sq. yd. usually required for stone not previously coated with oil.

After the application of the bituminous cement a second layer of stone substantially free from dust or excessively fine material is spread. It is smaller sized pieces of stone than that used in the first layer and it is spread in a thinner layer, using sufficient to cover the underlying layer with little or no excess. It is good practice for this layer to use stone substantially all of which passes a screen on which the stone used in the first layer is retained. For instance, if stone in the first layer is retained on 1½" screen, and for use in the second layer, it should pass 1½" screen and be retained on ¾" screen. I prefer, however, to use stone in the first layer which passes 2½" and is retained on 1" screen and for the second layer use stone passing 1" and retained on ½".

The oil coating of this second layer must either be omitted or applied to the stone of this layer before it is spread. It is preferable to use for this layer, stone which has been coated with oil several hours before it is spread in place, but the oil coating may be omitted without departing from the spirit of the invention, as the chief consideration is the oil coating applied to the stone which forms the body of the pavement.

After the second or intermediate layer of stone has been spread, it is compacted with heavy roller until firmly seated on the underlying layer and then it is in turn coated with the heated bituminous cement, using from 20 to 50% of the quantity applied to the first layer, and afterwards covered with fine stone, coarse sand or grit which by preference has been coated with oil some time previous to its use.

In some cases it has been found advisable to spread or broadcast over the lower layer after the application of the bituminous cement, but before spreading the intermediate layer of stone, a thin layer of coarse sand, preferably coated with oil which is spread at the rate of approximately 15 to 30 lbs. per sq. yd. Then after spreading the intermediate course of stone and rolling until firmly seated in place, coating it with the bituminous cement as described above.

Although the use of oil-coated stone for the intermediate and finishing layer is not essential to my process, I prefer to use it wherever a superior product is desired.

After the finishing course of fine stone, stone grit, fine gravel or sand is spread, it is preferably to roll the surface to force the top coat into the interstices of the intermediate course of stone and bind the two layers together. It may, however, be thrown open to traffic without rolling, provided the fine material thrown to the sides of the street by passing vehicles is replaced until sufficient has been bonded to the surface by traffic to effectively seal the surface to the action of the elements.

In some instances the coating of bituminous cement upon the intermediate layer of stone and the top dressing of fine stone or grit will be dispensed with and in lieu thereof using a mixture of bitumen and mineral aggregate which may be spread to any desired depth from ½" to 2" according to traffic conditions, then firmly compacting it in place. Where this is done it is advisable to use slightly smaller stone for the intermediate layer, preferably stone passing ¾" screen and retained on 8 to 19 mesh, using sufficient to thoroughly cover without appreciable excess the bituminous coating upon the underlying layer of coarse stone. The same size stone may be used as for the intermediate layer and a very thin dressing of finer stone applied and rolled until firmly seated in place before the layer of bitumen and mineral aggregate is applied. After spreading the layer of bitumen and mineral aggregate the entire mass should be thoroughly compacted until it becomes unyielding under the action of the roller.

I claim:

1. The method of surfacing roads which consists of providing upon a previously prepared foundation, a course of oil coated stone and prior to its ultimate compression applying thereover a coating of heated bituminous composition, then spreading thereon a relatively thin, intermediate course of oil coated stone particles which are approximately one-half to one-quarter the size of the stone particles comprising the lower course and after partial compression spraying the surface with heated bituminous composition, then applying thereover a finishing course of oil coated fine mineral matter.

2. The method of surfacing roads which consists in providing upon a previously prepared foundation a layer of oil coated stone then prior to its ultimate compaction, applying a coating of heated bituminous cement at the rate of approximately 8 to 20 lbs. per sq. yd., then spreading thereover a relatively thin, intermediate layer of dry uncoated stone, the particles of which are approximately one half to one quarter the size of the stone particles comprising the lower layer and after applying a coat of the heated bituminous cement approximately 20 to 40% of the quantity used on the lower layer, spreading thereover a finishing layer of dry stone screenings, gravel or sand, substantially all of which passes ½" screen and compacting the mass.

3. A process of surfacing roads which consists in providing upon a previously prepared foundation a layer of oil coated stone, applying a coating of heated bituminous cement having a penertration within the range of 50 to 100° (100 grams in 5 sec.) applied at the rate of 8 to 20 lbs. per sq. yd., then spreading thereover a relatively thin layer of small stones, compressing it and applying thereto a heated bituminous cement at the rate of 2 to 8 lbs. per sq. yd., and thereafter applying a thin layer of grit, coarse stone or fine gravel, compacting the mass until it becomes unyielding under the action of the roller.

4. A method of surfacing roads which consists in providing upon a previously prepared foundation a layer of oil coated stone, compacting it until firmly seated in place then applying thereover heated bituminous cement sufficient in quantity to bond the stone firmly together and covering this with a thin layer of small stone substantially free from fine material which is firmly seated upon the underlying layer by compaction and finally covering the surface to any desired depth from ½" to 2" with a mixture of bitumen and mineral aggregate and compacting the mass until it becomes unyielding under the action of the roller.

5. The method of surfacing roads which consists of providing upon a previously prepared foundation, a course of oil coated stone and prior to its ultimate compression applying thereover a coating of heated bituminous composition, then spreading thereon a relatively thin, intermediate course of oil coated stone particles which are substantially smaller than the size of the stone particles comprising the lower course and after partial compression spraying the surface with heated bituminous composition then applying thereover a finishing course of oil coated fine mineral matter, the oil used in such layers being a substantially non-volatile mobile oil.

6. A process of making a road from five essential materials, namely: (a) coarse stone, (b) finer stone, (c) fine gritty mineral matter, (d) a substantially non-volatile oil, and (e) a bituminous cement, which comprises (A) forming a layer of the coarse stone the pieces of which are coated with a substantially non-volatile mobile oil, and coating the same with hot bituminous cement; (B) forming thereon a second layer of the finer stone the pieces of which are coated with a substantially non-volatile mobile oil and coating the same with hot bituminous cement, and (C) applying a top coating of the fine gritty mineral matter, said steps A, B, and C being performed in the order stated, but the sequence of the steps of coating the stone with oil and spreading it in layers being changeable at will.

In testimony whereof I affix my signature.

EDWIN C. WALLACE.